US008736466B2

(12) United States Patent
Lamping et al.

(10) Patent No.: US 8,736,466 B2
(45) Date of Patent: *May 27, 2014

(54) AIRCRAFT TIRE PRESSURE LOOP LINK

(71) Applicant: Eldec Corporation, Lynwood, WA (US)

(72) Inventors: Jeff Lamping, Snohomish, WA (US); Mark Finefrock, Lake Stevens, WA (US)

(73) Assignee: Eldec Corporation, Lynnwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,219

(22) Filed: Oct. 8, 2012

(65) Prior Publication Data

US 2013/0069443 A1 Mar. 21, 2013

Related U.S. Application Data

(63) Continuation of application No. 13/289,555, filed on Nov. 4, 2011, now Pat. No. 8,305,237, which is a continuation of application No. 12/409,432, filed on Mar. 23, 2009, now Pat. No. 8,059,014.

(60) Provisional application No. 61/038,556, filed on Mar. 21, 2008.

(51) Int. Cl.
    *G08B 21/00* (2006.01)

(52) U.S. Cl.
    USPC ............. 340/945; 340/425.5; 340/568.1

(58) Field of Classification Search
    USPC ............ 340/945, 438, 425.5, 447, 442, 445, 340/448, 444, 572.1–572.9, 568.1
    See application file for complete search history.

(56) References Cited

U.S. PATENT DOCUMENTS

| 4,334,428 | A | * | 6/1982 | Fima et al. ................... 73/146.5 |
| 4,724,389 | A | * | 2/1988 | Hyde et al. ................... 324/318 |
| 5,231,391 | A | | 7/1993 | Rigaux |
| 5,853,020 | A | | 12/1998 | Widner et al. |
| 6,839,035 | B1 | | 1/2005 | Addonisio et al. |
| 6,889,543 | B2 | | 5/2005 | Gautier |
| 7,202,778 | B2 | | 4/2007 | Buenz et al. |
| 8,059,014 | B2 | * | 11/2011 | Lamping et al. ............. 340/945 |
| 8,305,237 | B2 | * | 11/2012 | Lamping et al. ............. 340/945 |
| 2002/0190853 | A1 | | 12/2002 | Nigon et al. |
| 2005/0066718 | A1 | * | 3/2005 | Pradier et al. .................. 73/146 |
| 2005/0099283 | A1 | | 5/2005 | Johnson et al. |

(Continued)

OTHER PUBLICATIONS

EPO, International Search Report and Written Opinion in counterpart International Patent Application No. PCT/US2013/034675 dated Jun. 6, 2013.

*Primary Examiner* — Daniel Previl
(74) *Attorney, Agent, or Firm* — Fulwider Patton LLP

(57) ABSTRACT

The aircraft tire pressure loop link is formed of first and second single metal loops connected by parallel spaced apart metal shafts, and provides for coupling a magnetic field between a wheel hub coil and a tire pressure sensor coil to provide electromagnetic communication between a control unit connect to the wheel hub coil and a tire pressure sensor connected to the tire pressure sensor coil. The current induced in the first single metal loop travels the distance from the edge of the wheel axle coil to the periphery of the of the wheel rim to the second single metal loop, which generates the flux in the tire pressure sensor receiver coil necessary to power the tire pressure sensor.

6 Claims, 7 Drawing Sheets

(56) References Cited

U.S. PATENT DOCUMENTS

| | | |
|---|---|---|
| 2005/0128014 A1* | 6/2005 | Matsuura et al. ............... 331/86 |
| 2005/0179529 A1 | 8/2005 | Sato |
| 2005/0186055 A1* | 8/2005 | Hyatt ........................... 414/427 |
| 2005/0264406 A1* | 12/2005 | Myhre et al. .................. 340/445 |
| 2006/0116168 A1* | 6/2006 | Kushima ....................... 455/558 |
| 2008/0084331 A1 | 4/2008 | Pradier et al. |
| 2009/0237273 A1 | 9/2009 | Lamping et al. |

* cited by examiner

AIRCRAFT TIRE PRESSURE LOOP LINK

CROSS-REFERENCES TO RELATED APPLICATIONS

This application is a continuation of U.S. Ser. No. 13/289,555, filed Nov. 4, 2011, now U.S. Pat. No. 8,305,237, which is a continuation of U.S. Nonprovisional application Ser. No. 12/409,432 filed Mar. 23, 2009, now U.S. Pat. No. 8,059,014, which claims priority to and is based upon Provisional Application No. 61/038,556, filed Mar. 21, 2008.

BACKGROUND

This invention relates generally to vehicle tire pressure control systems, and more particularly relates to a system for transmitting power to an aircraft tire pressure sensor from a control unit associated with a wheel hub and transmitting data between the aircraft tire pressure sensor and the control unit. The invention pertains more specifically to a communication link between a tire pressure sensor on a wheel rim and control electronics connected to a wheel hub, particularly for aircraft.

It is useful in an airplane to measure the pressure of each tire and display this information in the cockpit. It is necessary to communicate this information from the wheel rim to the hub, from the wheel hub to the electronics located on the wheel axle, and then from the electronics unit to the cockpit.

One known tire pressure system uses a pair of transformer coils to communicate between a primary and secondary coil in the wheel axle. These transformers are coaxial and face each other. A length of wire connected to the secondary of the transformer pair connects directly with the tire pressure sensor that is located on the periphery of the wheel rim. Another known device for enhancing the magnetic coupling in a RFID wireless communication system includes first and second antenna coils connected together by electrical connectors in a closed loop and formed on a flexible substrate that can be folded around a magnetic flux blocker to avoid magnetic interference from the magnetic flux blocker. However, it is desirable to provide communication between an airplane wheel hub and a tire pressure sensor located on the rim of the wheel up to six inches away from the wheel hub without using electrical connections that can be unreliable and easily be broken in a harsh airplane wheel environment. It is thus desirable to provide a non-contact method of communication between an airplane wheel hub and a tire pressure sensor located on the rim of the wheel that does not require electrical connections or a length of wire to communicate between the wheel hub and the tire pressure sensor.

A magnetically coupled antenna range extender is also known that is structured to be interposed between an RF antenna and an electronic device from 0.5 to 5 centimeters from the RF antenna or the electronic device, for extending the operating range of communication between the RF antenna and the electronic device. The antenna range extender includes a passive series tuned resonate circuit that must be tuned to resonate substantially at the frequency of an RF signal radiated by the RF antenna. The passive series tuned resonate circuit can be formed by an open loop coil of an electrical conductor, with a capacitor connected in series and completing the circuit. However, it has been found that an electromotive force can be induced in such a loop by stray magnetic flux that can generate an electric current that can interfere with a desired signal being conducted.

A need therefore remains to reduce the cost of the device that links the two coils, and to reduce the complexity of the device that links the magnetic field, in a manner that avoids the generation of signal interference, the use of unreliable electrical connections, and the use wires for electrical connections, which can easily break in the harsh environment of the airplane wheel. The present invention fills this and other needs.

SUMMARY OF THE INVENTION

Briefly and in general terms, the invention provides for an aircraft tire pressure loop link for electromagnetically coupling a magnetic field between a wheel hub coil and a tire pressure sensor coil that does not use unreliable electrical connections and does not use wires that are otherwise prone to breaking in the harsh environment of the airplane wheel.

Accordingly, the present invention provides for an aircraft tire pressure loop link that can be formed as a rigid first or primary single metal loop connected by a rigid pair of spaced apart electrically conductive connecting arms with a rigid second or secondary single metal loop, with the first or primary single metal loop being configured to be mounted adjacent to a wheel axle electromagnetic transceiver drive coil, and the second single metal loop being configured to be mounted adjacent to a tire pressure sensor transceiver coil. The current induced in the first single metal loop travels the distance from the edge of the wheel axle coil to the periphery of the wheel rim to the second single metal loop, which generates the flux in the tire pressure sensor receiver coil necessary to power the tire pressure sensor.

The pair of spaced apart electrically conductive connecting arms is typically formed from first and second single metal loops and connecting parallel spaced apart metal shafts that can be made from a metal, such as aluminum or titanium, for example, that need not be a permeable metal, to couple flux over the needed distance. In order to collect, concentrate and direct an impinging magnetic flux from the wheel axle electromagnetic transceiver coil to the first or primary single metal loop, the first or primary single metal loop advantageously includes a magnetic flux collector insert member electrically connected and attached to the first single metal loop, to collect, concentrate and direct the impinging magnetic flux through an area of a central portion of a cross sectional area enclosed by the first single metal loop. The aircraft tire pressure loop link can be manufactured by stamping and bending, and can be scaled easily to work in smaller or bigger wheel diameters. Electrical connections are not needed between the tire pressure sensor and the wheel hub coil. Hence, the present invention uses a more reliable method to communicate with the tire pressure sensor. The simplicity of the design makes it much easier to produce. The design is also lower cost. The design can also be made strong by using thicker sheet metal so that it can withstand the harsh environment in the airplane wheel. The design is non-contact since the coupling device does not contact the wheel hub coil.

The aircraft tire pressure loop link allows communication to occur through a magnetic field coupling a tire pressure sensor and a wheel axle coil. The aircraft tire pressure loop link allows the coupling of flux over a significant distance without the need to use permeable materials bridging the entire distance, and allows signal coupling to occur without requiring contact with the wheel hub coil in any way.

These and other aspects and advantages of the invention will become apparent from the following detailed description and the accompanying drawings, which illustrate by way of example the features of the invention.

DETAILED DESCRIPTION OF THE PREFERRED EMBODIMENTS

While primary and secondary transformer coils have been used to communicate between a tire sensor and a wheel axle to convey tire pressure information through the wheel axle, with a length of wire connecting the secondary coil directly with the tire pressure sensor, this has proved unreliable in communicating between an airplane wheel hub and a tire pressure sensor located on the rim of the wheel up to six inches away from the wheel hub as is needed, particularly since electrical connections that can be unreliable and easily be broken in a harsh airplane wheel environment.

A tire pressure monitor system was developed in which an electronics unit located in the hub of the wheel communicates with a tire pressure sensor near the rim of the wheel using a magnetic field. A coil centered on the wheel axle and located on the hub of the wheel produces the magnetic field. This magnetic field can be coupled to a tire pressure sensor receiver coil using a length of thin and highly permeable multilayer and laminated metal structure to couple flux from the edge of the wheel hub coil out to the periphery of the wheel rim where the receiver coil of the tire pressure sensor is located. Information can be transferred to and from the tire pressure sensor through this magnetic field coupling the two coils. However, the high permeability of the metal flux link couples a fraction of the total flux out to the length of material and into the tire pressure sensor coil. Communication is not possible using this magnetic field alone because the magnetic field strength is not strong enough to power up the tire pressure sensor.

Figure 1:
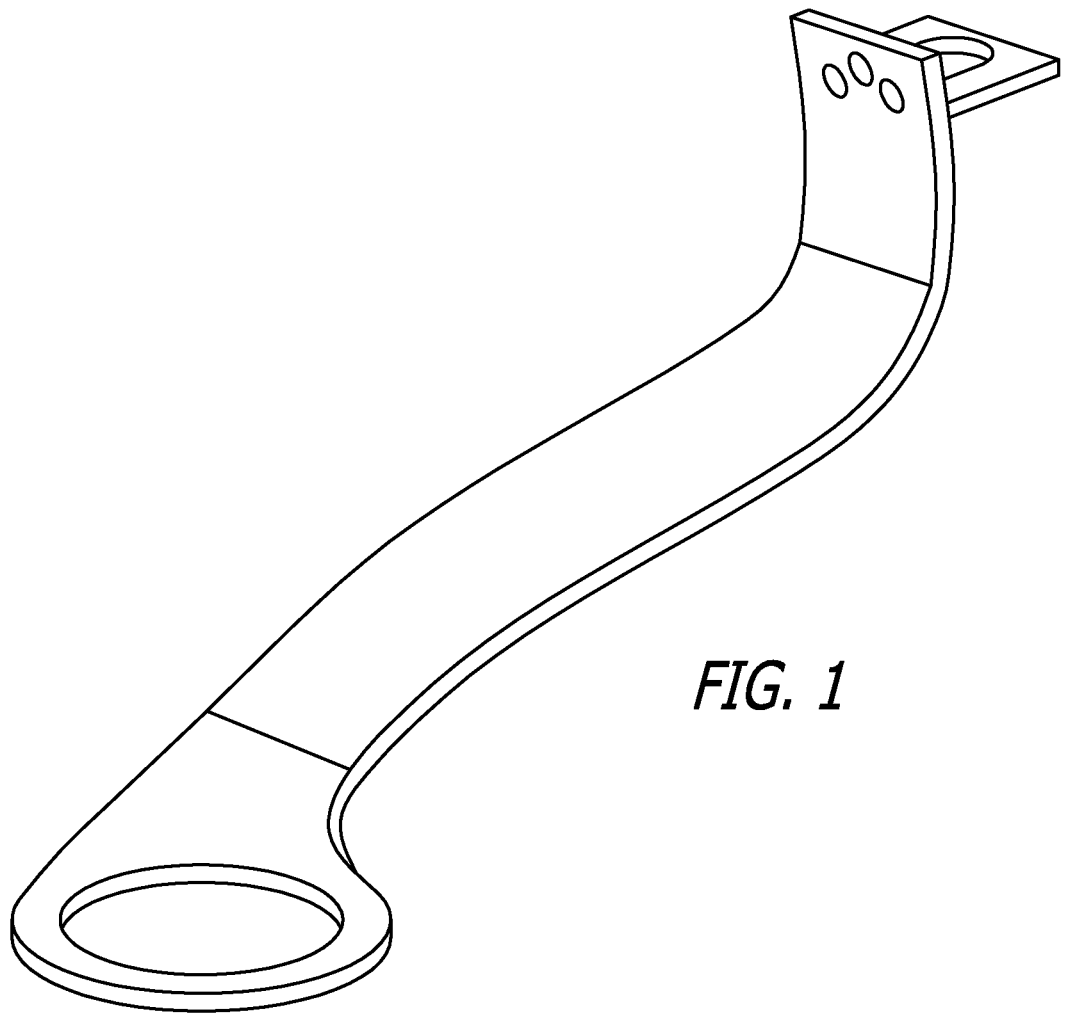
FIG. 1 is a perspective view of a highly permeable multi-layer and laminated metal flux link.
Figure 2A:
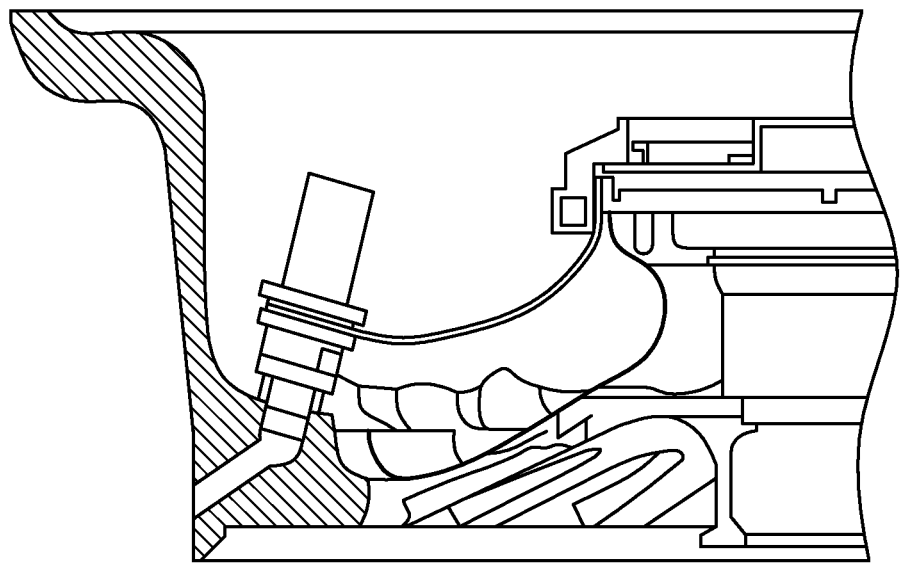
FIG. 2A shows partial views illustrating the mounting of the flux link of FIG. 1 in an aircraft wheel electromagnetically connecting a wheel hub to a tire pressure sensor.
Figure 2B:
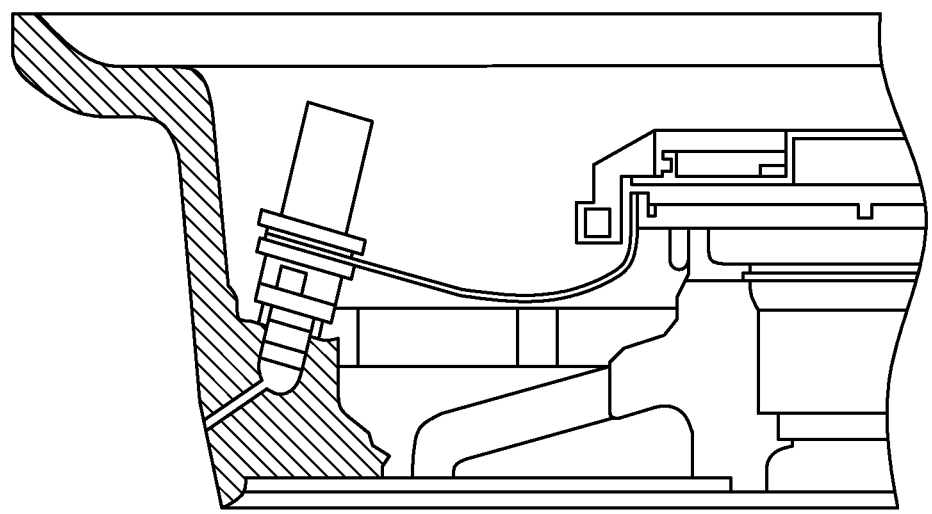
FIG. 2B shows partial views illustrating the mounting of the flux link of FIG. 1 in another aircraft wheel electromagnetically connecting a wheel hub to a tire pressure sensor.

One method of increasing the strength of the magnetic field is to insert a magnetic field coupling device between the edge of the wheel hub coil and the tire pressure sensor coil. One approach to enhance the coupled magnetic field is to collect flux with a highly permeable magnetic metal strip. This strip can be called a flux link, and is shown in FIG. 1. A diagram of the flux link installed in a Messier-Bugatti airplane wheel is shown in FIG. 2A, and a diagram of the flux link installed in a Goodrich airplane wheel is shown in FIG. 2B. The permeable magnetic metal strip couples flux about four inches down the flux link to the tire pressure sensor body. The permeable body of the tire pressure sensor further couples the flux up through the tire pressure sensor receiver coil. Because the frequency of operation is so high (135 KHz), the permeable metal object must be many layers of a very thin (0.004 inch) magnetic material to keep the losses caused by eddy currents low. One implementation of the design required 10 insulated layers of the thin and highly permeable magnetic material. The use of such a large number of layers of such thin and highly permeable magnetic materials results in a high complexity and a high cost to provide sufficient magnetic field strength to allow transfer of information to and from the tire pressure sensor through such a magnetic field coupling.

A tire pressure monitor system for magnetically transferring a wheel hub magnetic field through a thin and highly permeable multilayer laminated metal structure typically only couples a fraction of the magnetic flux over the distance between a wheel axle coil and a tire pressure sensor coil, and typically is not strong enough to power up a tire pressure sensor sufficiently for purposes of communication of information from the tire sensor, because of the low magnetic field strength available; and a similar system utilizing a highly permeable magnetic metal flux link utilizing many layers of thin and highly permeable magnetic materials results in high complexity and costs of production.

Accordingly, the present invention provides for an improved method and system for coupling a magnetic field between a wheel hub coil and a tire pressure sensor coil that reduces the cost of the device that links the two coils, and reduces the complexity of the device that links the magnetic field, without using unreliable electrical connections and wires that can easily break in the harsh environment of the airplane wheel. An example of the aircraft tire pressure loop link of the invention is illustrated in FIGS. 3-8.

Figure 3:
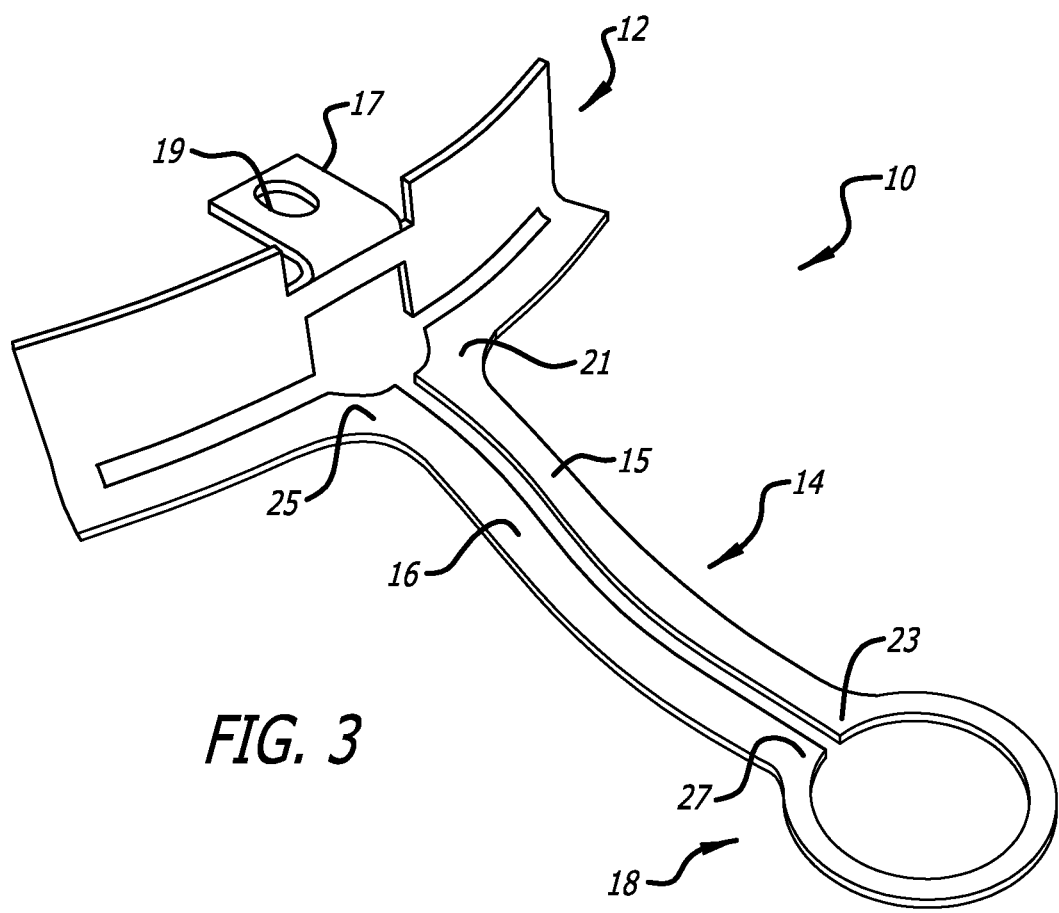
FIG. 3 is a perspective view of an aircraft tire pressure loop link according to the invention.
Figure 4:
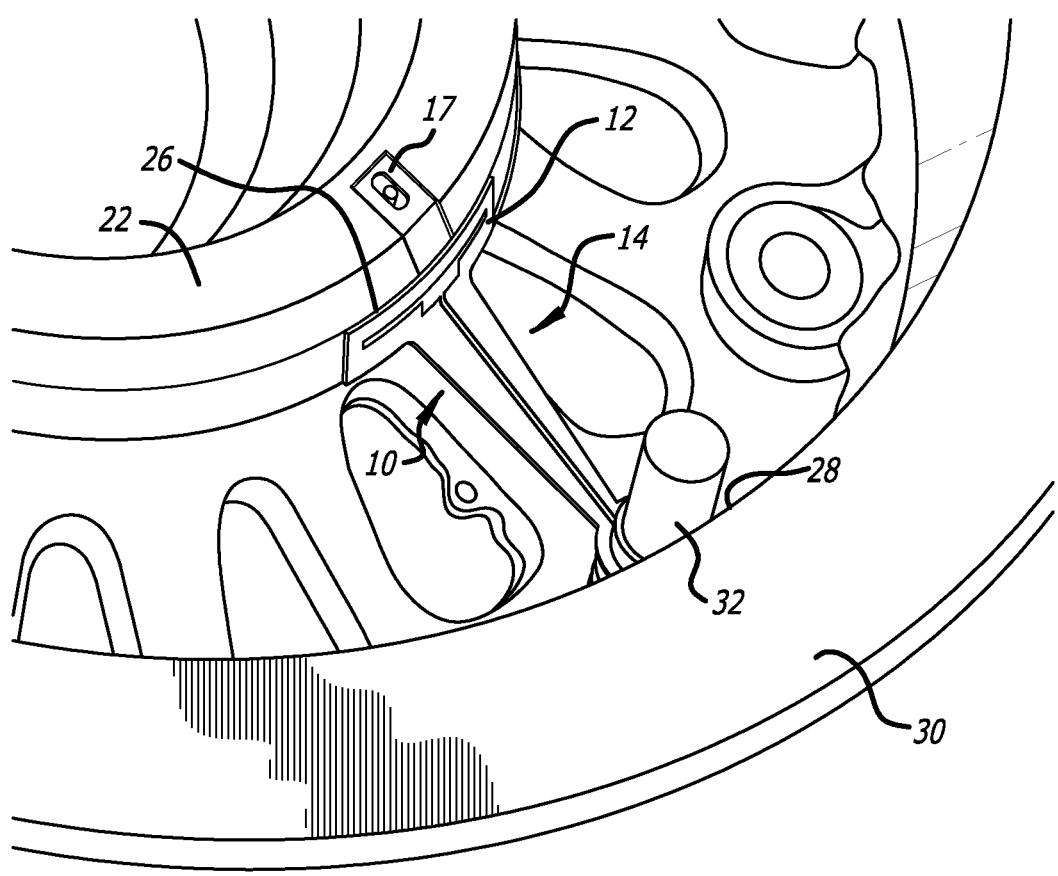
FIG. 4 is a perspective view illustrating the mounting of the aircraft tire pressure loop link of FIG. 3 in an aircraft wheel, electromagnetically connecting a wheel hub to a tire pressure sensor.
Figure 5:
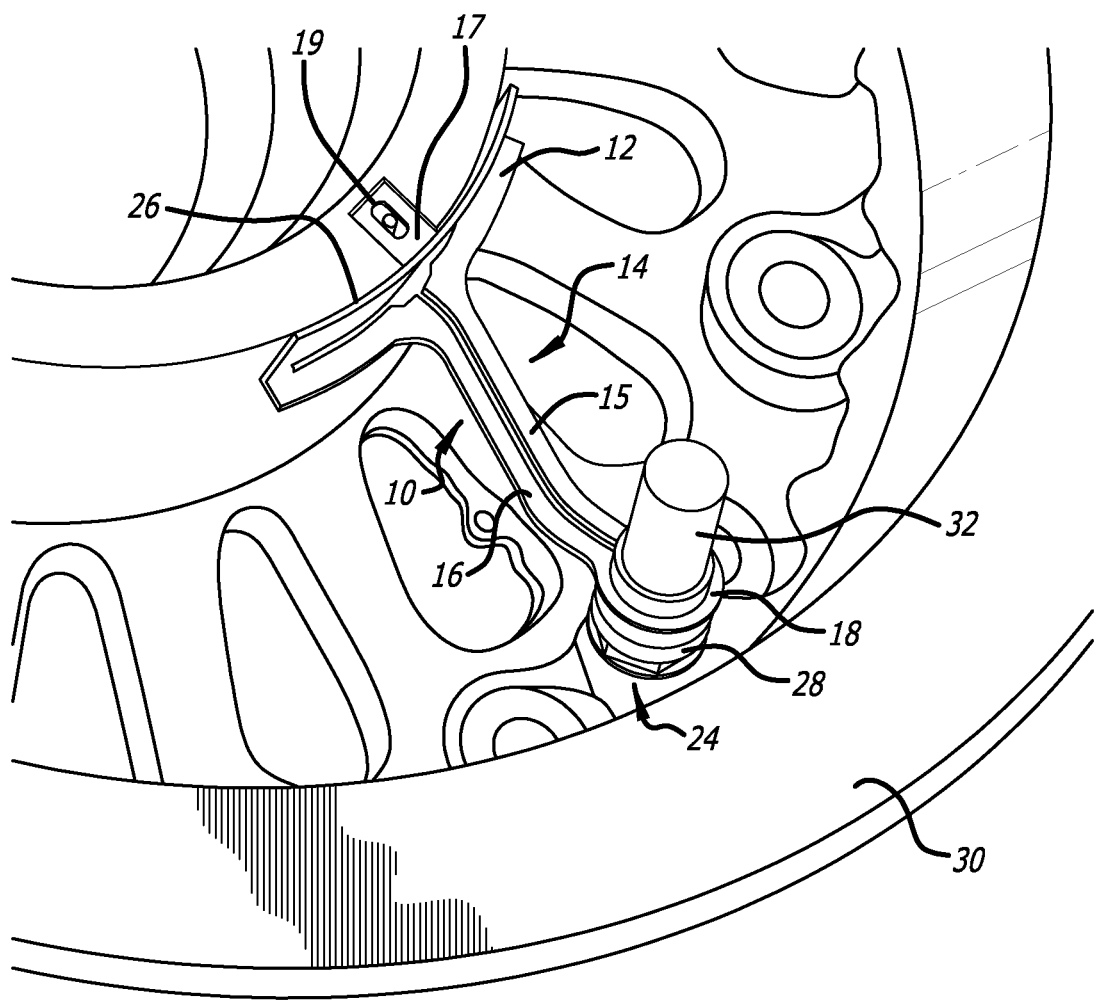
FIG. 5 is another perspective view similar to FIG. 4, illustrating the mounting of the aircraft tire pressure loop link of FIG. 3 in an aircraft wheel, electromagnetically connecting a wheel hub to a tire pressure sensor.
Figure 6:
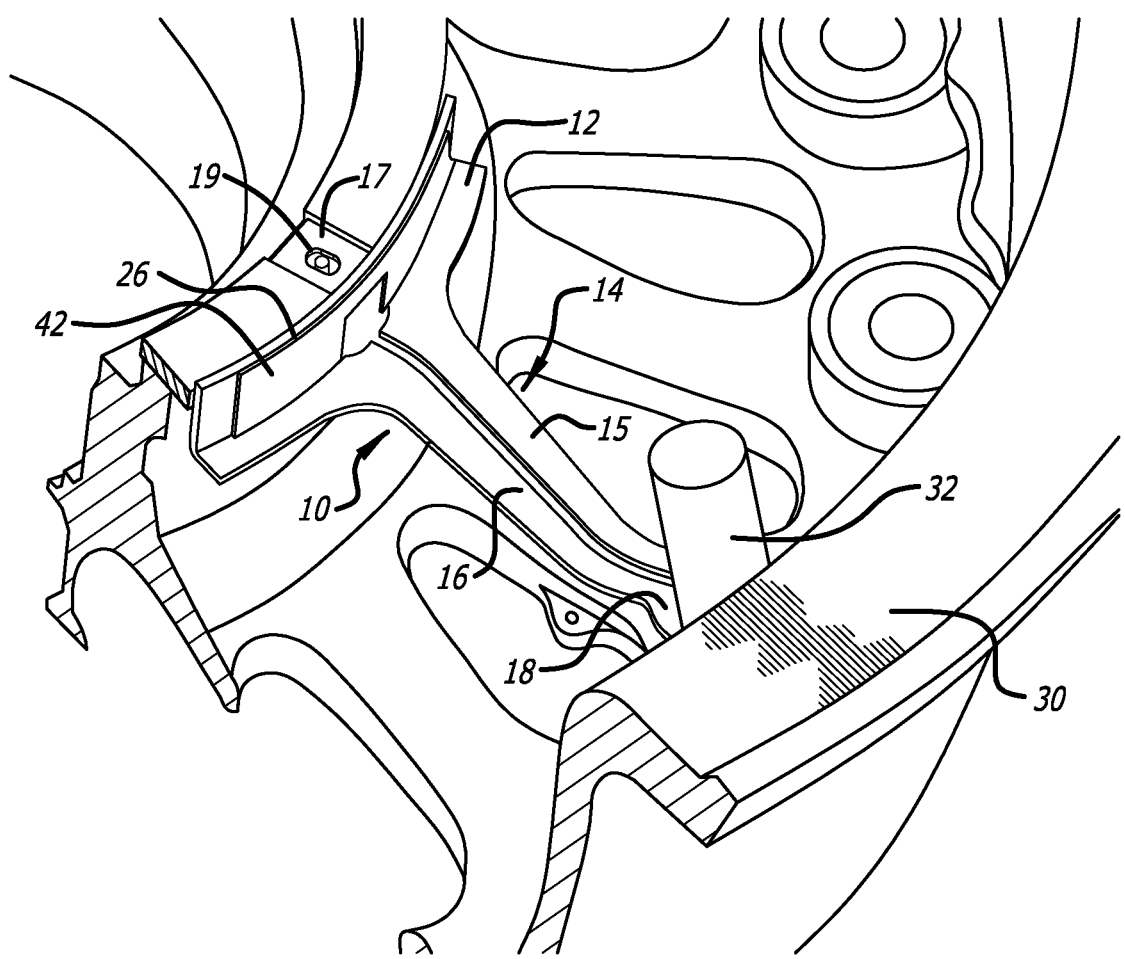
FIG. 6 is another perspective view similar to FIG. 4, illustrating the mounting of the aircraft tire pressure loop link of FIG. 3 in an aircraft wheel, electromagnetically connecting a wheel hub to a tire pressure sensor.

The invention is advantageous in that it does not use a pair of wires to electrically connect the axle wheel coil with the tire pressure sensor receiver coil. The aircraft tire pressure loop link 10 of the invention is typically formed as a rigid first or primary single metal loop 12, a rigid pair of spaced apart electrically conductive connecting arms 14, typically including parallel spaced apart metal shafts 15, 16, and a rigid second or secondary single metal loop 18. The parallel spaced apart metal shafts are preferably closely spaced apart by a small gap, to minimize their loop area. The pair of spaced apart electrically conductive connecting arms is rigidly electrically connected between the first or primary single metal loop and the second or secondary single metal loop. As is illustrated in FIG. 3, the shaft 15 of the pair of spaced apart electrically conductive connecting arms is rigidly electrically connected between a first portion 21 of the first or primary single metal loop 12 and a first portion 23 of the second or secondary single metal loop 18, and the shaft 16 is rigidly electrically connected between a second portion 25 of the first or primary single metal loop 12 and a second portion 27 of the second or secondary single metal loop 18. The first or primary single metal loop is configured to be mounted adjacent to an electromagnetic transceiver drive coil 20, illustrated in FIG. 8, of a wheel axle 22, and the second single metal loop is configured to be mounted adjacent to a tire pressure sensor transceiver coil 24. The current induced in the first or primary single metal loop travels the distance from the edge 26 of the wheel axle transceiver drive coil to the periphery 28 of the wheel rim 30 to the second single metal loop, which generates the flux in the tire pressure sensor receiver coil necessary to power a tire pressure sensor 32.

The aircraft tire pressure loop link of the invention can be made from a variety of metallic materials, such as low magnetically permeable metals, including aluminum or titanium, for example, that are readily available, and it is not necessary to use a highly magnetically permeable metal to couple flux over the needed distance. The pair of spaced apart electrically conductive connecting arms can be made of any desirable length without loss of coupling enhancement between a wheel axle electromagnetic transceiver drive coil and a tire pressure sensor transceiver coil. The flux is linked in one turn of a metal loop and the current induced in the loop travels the distance from the edge of the wheel axle coil to the periphery of the of the wheel rim, where the second single loop of metal generates the flux in the tire pressure sensor receiver coil. The aircraft tire pressure loop link of the invention advantageously provides a low impedance electromagnetic signal path connection between a wheel axle electromagnetic transceiver drive coil and a tire pressure sensor transceiver coil, so that no electrical insulation is required over the pair of connecting arms of the loop link. In addition, the aircraft tire pressure loop link of the invention advantageously provides a low voltage electromagnetic signal path connection between the wheel axle electromagnetic transceiver drive coil and the tire pressure sensor transceiver coil, so that the loop link is not a source of electric field radiation and is not sensitive to electric field interference. The aircraft tire pressure loop link of the invention also advantageously can typically be an intrinsically rigid, self-supporting structural part, not requiring any additional means of support.

Figure 7:
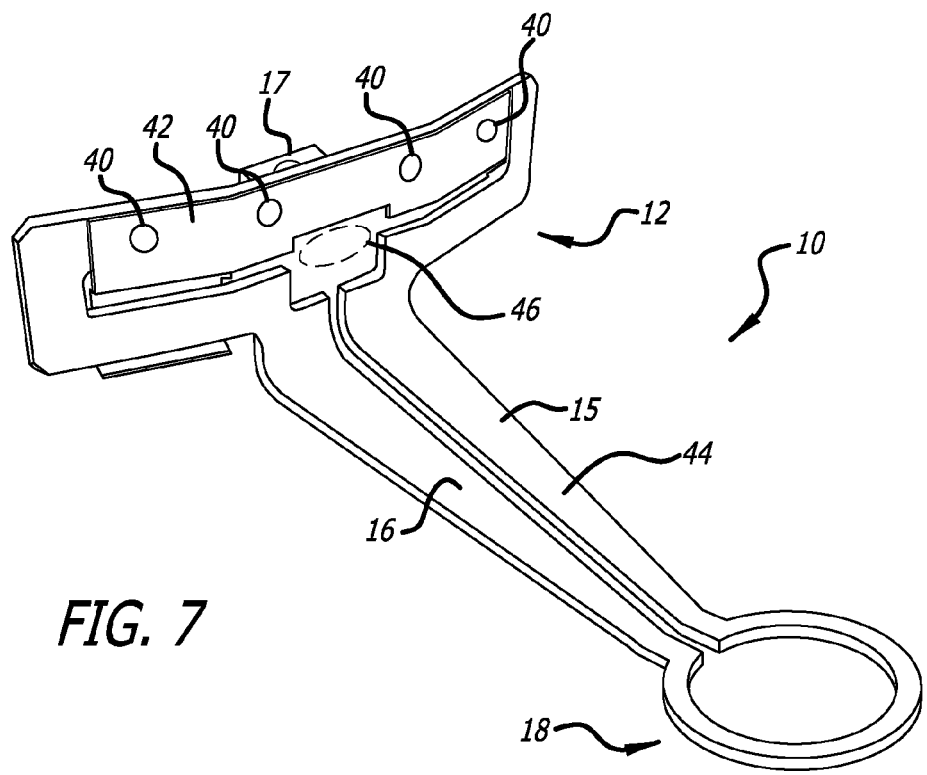
FIG. 7 is a front perspective view of the aircraft tire pressure loop link of FIG. 3 according to the invention.

FIG. 7 shows a drawing of the loop link of the present invention. Item 40 is an aluminum rivet. Item 42 indicates a highly permeable magnetic flux collector insert member typically electrically connected and attached to the first or primary single metal loop, such as by aluminum rivets, for example. Item 44 is a piece of aluminum sheet metal bent into shape. The magnetic flux collector insert member 42 provides a means of collecting an impinging magnetic flux from the wheel axle electromagnetic transceiver drive coil, and then concentrating and directing that magnetic flux through an area 46 of a central portion of the cross sectional area enclosed by the upper first or primary single metal loop 12. This greatly enhances the coupling efficiency of the loop link of the invention, by allowing a greater portion of the flux from the wheel axle electromagnetic transceiver drive coil to pass through the first or primary single metal loop as if the first or primary single metal loop were physically much larger. The magnetic flux collector insert member 42 is typically formed of a highly permeable magnetic metal, such as a nickel-iron-molybdenum alloy sold under the trademark HYMU-80, or a nickel-iron magnetic alloy sold under the trademark PERMALLOY.

Figure 8:
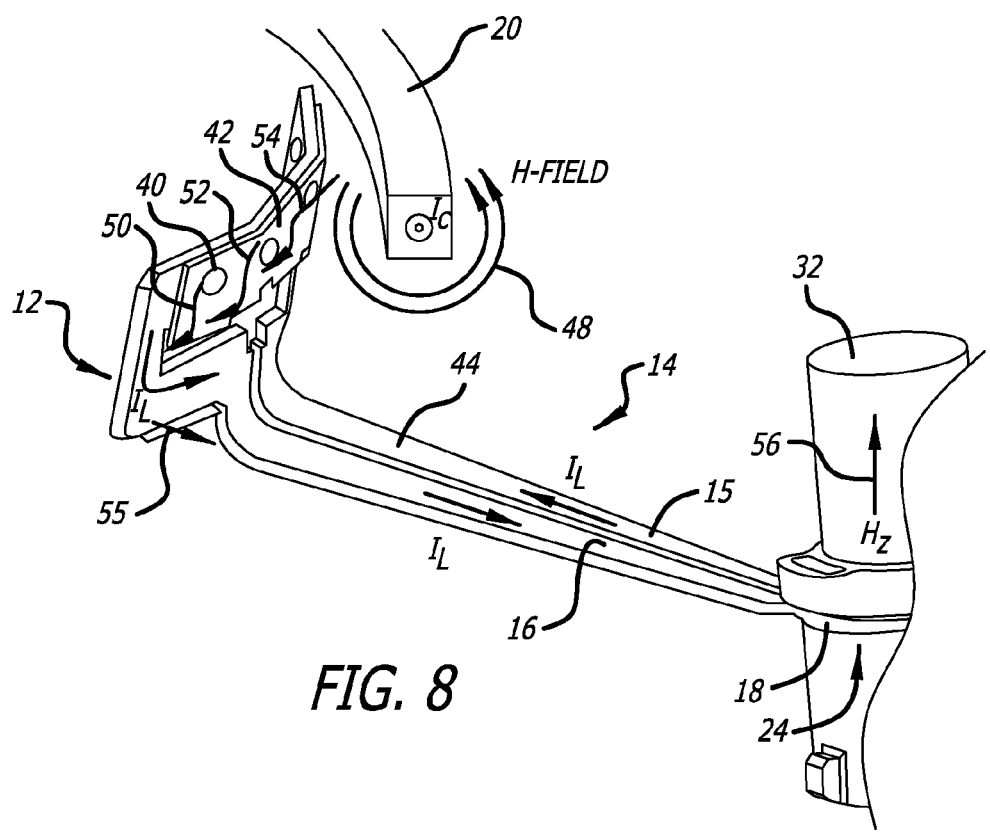
FIG. 8 is a functional, schematic diagram of the aircraft tire pressure loop link of FIG. 3 mounted in an aircraft wheel, illustrating the principles of operation of the aircraft tire pressure loop link.

FIG. 8 shows a functional, schematic diagram of the loop link of the present invention. The electromagnetic transceiver drive coil 20 is excited with an alternating current, $I_C$, typically at a frequency with any desired RFID frequency band. The current $I_C$ is shown flowing out of the paper. A magnetic field is produced that circles the electromagnetic transceiver drive coil 20 and is shown by flux lines 48. Some of this magnetic field 48 is coupled by the highly permeable magnetic metal of the magnetic flux collector insert member 42 and is shown as flux lines 50, 52 and 54. The flux is coupled through the cross sectional area 46 of the upper first or primary loop 12, as shown in FIG. 7. This sinusoidal flux induces a current ($I_L$) in the aluminum pair of spaced apart electrically conductive connecting arms 14 formed by the first and second parallel spaced apart metal shafts, items 15, 16. The current $I_L$ flows down the pair of spaced apart electrically conductive connecting arms 14 to a smaller, lower second or secondary single metal loop 18, and returns via the pair of spaced apart electrically conductive connecting arms 14 to the larger upper first or primary single metal loop 12. In the smaller, lower second or secondary single metal loop 18, the sinusoidal current generates a magnetic field shown as flux line 56 that excites the tire pressure sensor 24 located in that field.

The physics involved is determined by Ampere's circuital law. The circulation of the magnetic field intensity around any closed path is equal to the free current flowing through the surface bounded by the path. The closed path is the pair of spaced apart electrically conductive connecting arms 14 formed by the parallel spaced apart metal shafts 15, 16 of aluminum. If a magnetic field is directed through the cross sectional area enclosed by the larger upper first or primary single metal loop 12, then a current is induced in the larger upper first or primary single metal loop 12. The flux is directed through the loop area by coupling along the surface of the permeable magnetic metal, item 42. The magnetic field can be coupled directly to the cross sectional area of the loop without the use of the permeable metal. However, the permeable magnetic metal increases the amount of flux that can be linked in the upper loop cross sectional area. The coupled flux travels on the surface of the permeable magnetic metal and exists at the bottom of the upper loop, shown as flux line 58.

In the upper loop, Ampere's circuital law applies to the current $I_L$ and the magnetic field coupled through the loop area (see FIG. 7, area 46). The magnetic field cuts through area 46 and induces a current in the upper first or primary single metal loop 12 enclosing the area 46 by the following equations:

$$\oint_C (\nabla \times H) \cdot ds = \int_S J \cdot dS$$

$$\oint_C (\nabla \times H) \cdot ds = I_L$$

The magnetic field H is the field perpendicular to the cross sectional area 46, shown in FIGS. 7 and 8. The integral of this magnetic field must be computed numerically because the H-field is not constant on the closed path that circles the current loop $I_L$. The equation is shown to give the general theory of operation of the loop link. This equation shows that the magnetic field link in the cross sectional area that the aluminum pair of spaced apart electrically conductive connecting arms 14 encircles produces a current $I_L$ in the pair of spaced apart electrically conductive connecting arms 14.

Electrical connections are not needed between the tire pressure sensor and the wheel hub coil. Hence, this uses a more reliable method to communicate with the tire pressure sensor. The simplicity of the design makes it much easier to produce. The design is also lower cost. The design can also be made strong by using thicker sheet metal so that it can withstand the harsh environment in the airplane wheel. The design is non-contact since the coupling device does not contact the wheel hub coil.

The loop link was successfully demonstrated on a 787 main wheel rim half in a Crane Aerospace & Electronics laboratory coupling between the 83-202-01 tire pressure sensor and the axle remote data concentrator 142-12922 at Lynnwood, Wash.

We claim:

1. An aircraft tire pressure loop link for electromagnetically coupling a magnetic field between a wheel axle and a tire pressure sensor spaced apart from the wheel axle, the aircraft tire pressure loop link comprising:
- a first single metal loop configured to be mounted adjacent to the wheel axle;
- a magnetic flux collector insert member electrically connected to said first single metal loop, said magnetic flux collector insert member being configured to induce an electrical current in said first single metal loop in response to an impinging magnetic flux from the wheel axle; and
- a second single metal loop electrically connected to said first single metal loop to receive electrical current induced in said first single metal loop and to generate flux for powering the tire pressure sensor.

2. The aircraft tire pressure loop link of claim 1, wherein said first single metal loop is formed of a metal having low magnetic permeability.

3. The aircraft tire pressure loop link of claim 1, wherein said magnetic flux collector insert member is formed from a metal having high magnetic permeability.

4. The aircraft tire pressure loop link of claim 3, wherein said magnetic flux collector insert member is formed from a nickel-iron magnetic alloy.

5. The aircraft tire pressure loop link of claim 1, wherein said first single metal loop and said second single metal loop are electrically connected by a pair of spaced apart electrically conductive connecting arms, said pair of spaced apart electrically conductive connecting arms being configured to carry the electrical current generated in said first single metal loop from the wheel axle to said second single metal loop, said pair of spaced apart electrically conductive connecting arms having first and second parallel spaced apart metal shafts connected between said first single metal loop and said second single metal loop.

6. The aircraft tire pressure loop link of claim 1, wherein said second single metal loop is connected to said first single metal loop through at least one shaft comprising aluminum.

* * * * *